US010274902B2

(12) United States Patent
Tezuka

(10) Patent No.: US 10,274,902 B2
(45) Date of Patent: Apr. 30, 2019

(54) ELECTRONIC DEVICE, AND CONTROL METHOD OF AN ELECTRONIC DEVICE

(71) Applicant: Seiko Epson Corporation, Tokyo (JP)

(72) Inventor: Chisato Tezuka, Okaya (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/057,868

(22) Filed: Mar. 1, 2016

(65) Prior Publication Data

US 2016/0259302 A1 Sep. 8, 2016

(30) Foreign Application Priority Data

Mar. 6, 2015 (JP) ................................ 2015-045236

(51) Int. Cl.
*G04G 9/00* (2006.01)
*G01C 21/00* (2006.01)
*G04R 20/02* (2013.01)

(52) U.S. Cl.
CPC ........... *G04G 9/0076* (2013.01); *G01C 21/00* (2013.01); *G04R 20/02* (2013.01)

(58) Field of Classification Search
CPC .... G04B 19/22; G04B 19/221; G04B 19/223; G04B 19/225; G04B 19/226; G04B 19/228; G04G 9/0076
See application file for complete search history.

(56) References Cited

U.S. PATENT DOCUMENTS

2006/0002236 A1 1/2006 Punkka
2006/0252438 A1* 11/2006 Ansamaa ................ H04W 4/02 455/503
2008/0186809 A1* 8/2008 Ogasawara ............ G04R 20/08 368/47
2009/0135675 A1* 5/2009 Akiyama ............... G04R 20/06 368/14
2009/0190444 A1* 7/2009 Akiyama ............... G04R 20/06 368/14
(Continued)

FOREIGN PATENT DOCUMENTS

EP 2 916 181 A2 9/2015
JP 2014-169869 A 9/2014
(Continued)

OTHER PUBLICATIONS

Seiko ASTRON GPS Solar, Complete User Guide, 8×82 GPS Solar Watch (Chronograph), pp. 1-58, 2014.
(Continued)

*Primary Examiner* — Daniel P Wicklund
(74) *Attorney, Agent, or Firm* — Harness, Dickey & Pierce, P.L.C.

(57) ABSTRACT

An electronic device has a reception device; a display device; an input device; a display controller that controls the display device to display the set time zone data when a first operation of the input device instructing displaying time zone data is detected; a positioning driver that operates the reception device to run a reception process and acquire positioning information when a second operation of the input device instructing starting reception in the navigation mode is detected while time zone data is displayed on the display device; and a time zone setter that sets time zone data based on the acquired positioning information.

16 Claims, 11 Drawing Sheets

(56) References Cited

U.S. PATENT DOCUMENTS

| | | | | |
|---|---|---|---|---|
| 2010/0074059 | A1* | 3/2010 | Hasumi | G04C 3/008 368/47 |
| 2010/0091615 | A1* | 4/2010 | Scott | G04R 20/18 368/21 |
| 2010/0135124 | A1 | 6/2010 | Hirano | |
| 2013/0051186 | A1* | 2/2013 | Honda | G04R 20/04 368/47 |
| 2014/0247700 | A1* | 9/2014 | Honda | G04G 9/0076 368/21 |
| 2014/0247701 | A1* | 9/2014 | Honda | G04R 20/04 368/47 |
| 2014/0293756 | A1* | 10/2014 | Akiyama | G04R 20/02 368/47 |
| 2015/0146503 | A1* | 5/2015 | Nakanishi | G04G 9/0076 368/21 |
| 2015/0253739 | A1* | 9/2015 | Iida | G04G 9/00 368/80 |
| 2015/0253740 | A1* | 9/2015 | Nishijima | G04G 9/00 368/80 |
| 2016/0209813 | A1* | 7/2016 | Hasegawa | G04R 20/02 |

FOREIGN PATENT DOCUMENTS

| | | | |
|---|---|---|---|
| JP | 2014-196952 | A | 10/2014 |
| WO | 98/40795 | | 9/1998 |

OTHER PUBLICATIONS

Citizen, Instruction Manual, Eco-Drive, pp. 1-81, 2011.
Casio Computer Co., Ltd., Operation Guide 5412. pp. 1-13, 2014.

* cited by examiner

ELECTRONIC DEVICE, AND CONTROL METHOD OF AN ELECTRONIC DEVICE

CROSS-REFERENCE TO RELATED APPLICATION(S)

This application claims priority under 35 U.S.C. § 119 on Japanese Patent Application No. 2015-45236, filed Mar. 6, 2015. The content of this priority application is incorporated by reference in its entirety.

BACKGROUND

1. Technical Field

The present invention relates to an electronic device that receives satellite signals, and a control method of the electronic device.

2. Related Art

Electronic timepieces that receive satellite signals transmitted from GPS (Global Positioning System) satellites and correct the time displayed by the electronic timepiece are known from the literature. See, for example, JP-A-2014-196952.

When the electronic timepiece described in JP-A-2014-196952 is in the normal timekeeping mode and a button in the input device of the electronic timepiece is pressed to force reception in the navigation (positioning) mode, the electronic timepiece executes the reception process of the satellite signal in a navigation mode and acquires positioning information. Time zone data is also set based on the acquired positioning information at this time.

This electronic timepiece also has a function (time zone setting function) for selecting and setting the time zone in response to user operation of the input device.

In an electronic timepiece with a time zone setting function such as described in JP-A-2014-196952, a hand of the electronic timepiece usually indicates the time zone that is set when the time zone function is used. If the displayed time zone is not the time zone of the current location, the user may want to run the reception process in the navigation mode to automatically set the time zone for the current location.

However, because the time zone setting function operates in a different mode than the normal time display function, the user must operate the input device to stop the time zone setting function, return to the normal time display mode, and then operate another input device to execute the reception process in the navigation mode. Operation is thus complicated.

SUMMARY

An electronic device and a control method of an electronic device enabling setting the time zone with a simple operation.

An electronic device includes: a receiver that receives satellite signals; a display; an interface; a display controller that controls the display to display the set time zone data when a first operation of the interface instructing displaying time zone data is detected; a positioning driver that drives the receiver to run a reception process of the satellite signal in a navigation mode and acquire positioning information when a second operation of the interface instructing starting reception in the navigation mode is detected while the display is displaying time zone data; and a time zone setter that sets time zone data based on acquired positioning information.

When the user performs the first operation with the interface, the display controller displays the time zone that is set on the display. If the user then performs the second operation with the interface, the positioning driver runs the reception process and computes and acquires the positioning information. The time zone is then set based on the positioning information acquired by the time zone setter.

As a result, to make the positioning driver run the reception process after performing the first operation and displaying the set time zone on the display, the user can simply perform the second operation while the time zone is displayed, does not need to use the interface again to specifically end the time zone display, and operation is therefore simple.

Preferably in an electronic device according to another aspect, the positioning driver executes the reception process if the second operation is detected when time zone data is not displayed by the display.

Thus comprised, the positioning driver runs the reception process when the user performs the second operation in the normal display mode, which does not indicate the time zone on the display.

More specifically, the operation for starting the reception process of the positioning driver is the same when the time zone data is displayed and when in the normal display mode. As a result, operation is easier for the user to remember than when the operation that starts reception by the positioning driver is different in the time zone display mode and the normal display mode.

An electronic device according to another aspect further preferably also has a timekeeper that operates the receiver to run the reception process in the timekeeping mode to acquire time information when a third operation of the interface instructing starting reception in the timekeeping mode is detected when time zone data is not displayed by the display.

Thus comprised, the timekeeper runs the reception process and acquires time information when the user performs the third operation the time zone is displayed on the display. The internal time is also corrected based on the acquired time information.

As a result, to make the timekeeper run the reception process after performing the first operation and displaying the set time zone on the display, the user can simply perform the third operation while the time zone is displayed, does not need to use the interface again to specifically end the time zone display, and operation is therefore simple.

Further preferably in an electronic device according to another aspect, the timekeeper executes the reception process if the third operation is detected when time zone data is not displayed by the display.

Thus comprised, the timekeeper runs the reception process when the user performs the third operation in the normal display mode in which time zone data is not displayed on the display.

More specifically, the operation for starting the reception process of the timekeeper is the same when the time zone data is displayed and when in the normal display mode. As a result, operation is easier for the user to remember than when the operation that starts reception by the timekeeper is different in the time zone display mode and the normal display mode.

Further preferably in an electronic device according to another aspect, the display has a hand; and the display controller sets the hand to indicate the set time zone data when the first operation is detected, and while the hand indicates the time zone data, sets the hand to indicate the navigation mode if the second operation is detected and sets the hand to indicate the timekeeping mode if the second operation is detected.

Thus comprised, the user can know what time zone is set by performing the first operation and reading the hand, and when the second operation or third operation is performed to start the reception process, can know that the reception process is running and whether the reception process is running in the navigation mode or the timekeeping mode by reading the hand.

Because a single hand is used to indicate the time zone and the reception mode, the electronic device requires fewer hands than when the time zone and reception mode are indicated by different hands.

Further preferably in an electronic device according to another aspect, the display controller displays the reception result on the display if a fourth operation of the interface instructing displaying the reception result is detected while time zone data is displayed on the display.

If the user performs the fourth operation while time zone data is displayed by the display, the display controller displays the reception result on the display.

As a result, to display the reception result after performing the first operation to display the set time zone on the display, the user can simply perform the fourth operation while the time zone is displayed, does not need to use the interface again to specifically end the time zone display, and operation is therefore simple.

An electronic device according to another aspect preferably also has the controller including a mode setter that selects and sets either a time zone confirmation mode or time zone setting mode based on operation of the interface. The display controller displays the set time zone data on the display if a confirm time zone operation, which is the first operation of the interface, is performed and the time zone confirmation mode is set by the mode setter. The display controller displays the set time zone data on the display, and the time zone setter sets the time zone data according to the change time zone operation of the interface, if a set time zone operation of the interface is performed and the time zone setting mode is set by the mode setter. The positioning driver executes the reception process if the second operation is detected when the time zone confirmation mode is set, and does not execute the reception process if the second operation is detected when time zone setting mode is set.

Thus comprised, if the user performs the confirm time zone operation, the mode setter sets the time zone confirmation mode. If the user performs the set time zone operation, the mode setter sets the time zone setting mode.

If the time zone confirmation mode is set and the user performs the second operation, the positioning driver executes the reception process.

As a result, to force the positioning driver to run the reception process when the time zone confirmation mode is set, the user can simply perform the second operation while the time zone is displayed, does not need to use the interface again to specifically end the time zone display, and operation is therefore simple.

If the time zone setting mode is set and the user performs the second operation, the positioning driver does not execute the reception process.

As a result, if the time zone setting mode is set and the user wants to use the interface to set the time zone for a region different from the current location, the positioning driver does not execute the reception process even if the second operation is accidentally performed, and the time zone of the current location being set by the reception process can be prevented.

An electronic device according to another aspect preferably also has the controller including a mode setter that selects and sets either a time zone confirmation mode or time zone setting mode based on operation of the interface. The display controller displays the set time zone data on the display if a confirm time zone operation, which is the first operation of the interface, is performed and the time zone confirmation mode is set by the mode setter. The display controller displays the set time zone data on the display, and the time zone setter sets the time zone data according to the change time zone operation of the interface, if a set time zone operation of the interface is performed and the time zone setting mode is set by the mode setter. The positioning driver executes the reception process if the second operation is detected when the time zone confirmation mode is set, and executes the reception process if the second operation is detected when time zone setting mode is set.

Thus comprised, if the time zone confirmation mode or the time zone setting mode is set and the user performs the second operation, the positioning driver executes the reception process.

As a result, if the time zone setting mode or the time zone setting mode is set and the user wants to run the reception process with the positioning driver, the user simply performs the second operation while the time zone is displayed, does need to use the interface to end the time zone display, and operation is simple.

In an electronic device according to another aspect, the interface includes a crown and a button; and the mode setter detects the confirm time zone operation when the button is pushed while the crown is at the 0 stop.

Thus comprised, the user can check the time zone setting by simply pressing the button when the crown is at the 0 stop, and the time zone can be confirmed more easily than if the time zone must be checked by pulling the crown out to the first stop or second stop.

Thus comprised, the currently set time zone can be easily confirmed by performing the confirm time zone operation to set the time zone confirmation mode. The user also does not need to push the crown in to the 0 stop to end the time zone confirmation mode, and forgetting to push the crown in can be prevented.

Further preferably in an electronic device according to another aspect, the mode setter ends the time zone confirmation mode if a stop time zone confirmation operation of the interface instructing ending the time zone confirmation mode is detected.

Thus comprised, the user can immediately end the time zone confirmation mode and return to the normal display mode by performing the stop time zone confirmation operation.

Further preferably, the mode setter ends the time zone confirmation mode if a previously set hold-mode time passes without the interface being operated after the time zone confirmation mode is set.

Thus comprised, the time zone confirmation mode ends automatically if the hold-mode time passes without the interface being operated, and operation is therefore simpler than in a configuration in which the user must use the interface to exit the time zone confirmation mode.

Another aspect is a control method of an electronic device, the control method including: displaying the set time zone data on a display of the electronic device when a first operation of an interface of the electronic device instructing displaying time zone data is detected; driving a receiver of the electronic device to run a reception process to receive satellite signals in a navigation mode and acquire positioning information when a second operation of the interface instructing starting reception in the navigation mode is detected while the display is displaying time zone data; and setting time zone data based on acquired positioning information.

This aspect has the same effect as the electronic device described above.

Other objects and attainments together with a fuller understanding will become apparent and appreciated by referring to the following description and claims taken in conjunction with the accompanying drawings.

DESCRIPTION OF EMBODIMENTS

Preferred embodiments are described below with reference to the accompanying figures.

Figure 1:
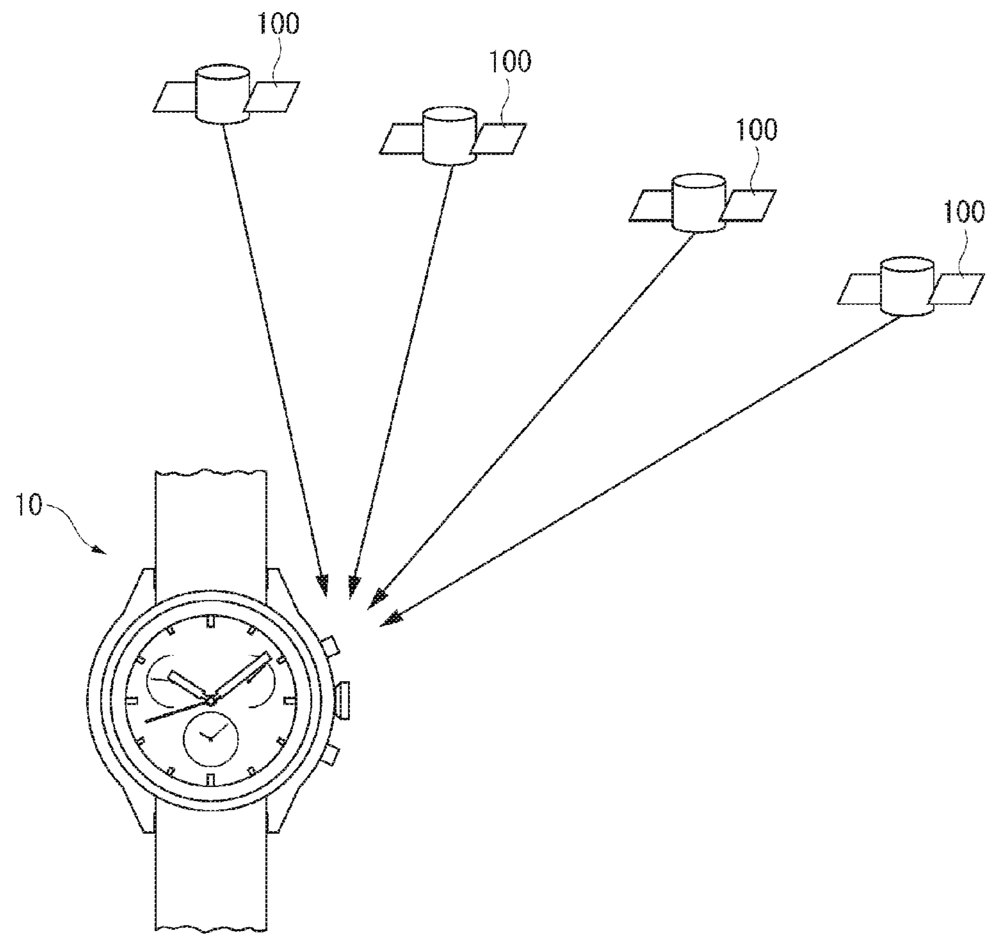
FIG. 1 schematically illustrates use of an electronic timepiece.

FIG. 1 illustrates the use of an electronic timepiece 10 according to this embodiment.

The electronic timepiece 1 described as an example of an electronic device receives satellite signals from at least one of the multiple positioning information satellites 100 orbiting the Earth on known orbits to acquire time information, and receives satellite signals from at least three of the positioning information satellites 100 to calculate positioning information. A GPS satellite 100 is an example of a positioning information satellite, and there are currently approximately 30 GPS satellites 100 in service.

Electronic Timepiece Construction

Figure 2:
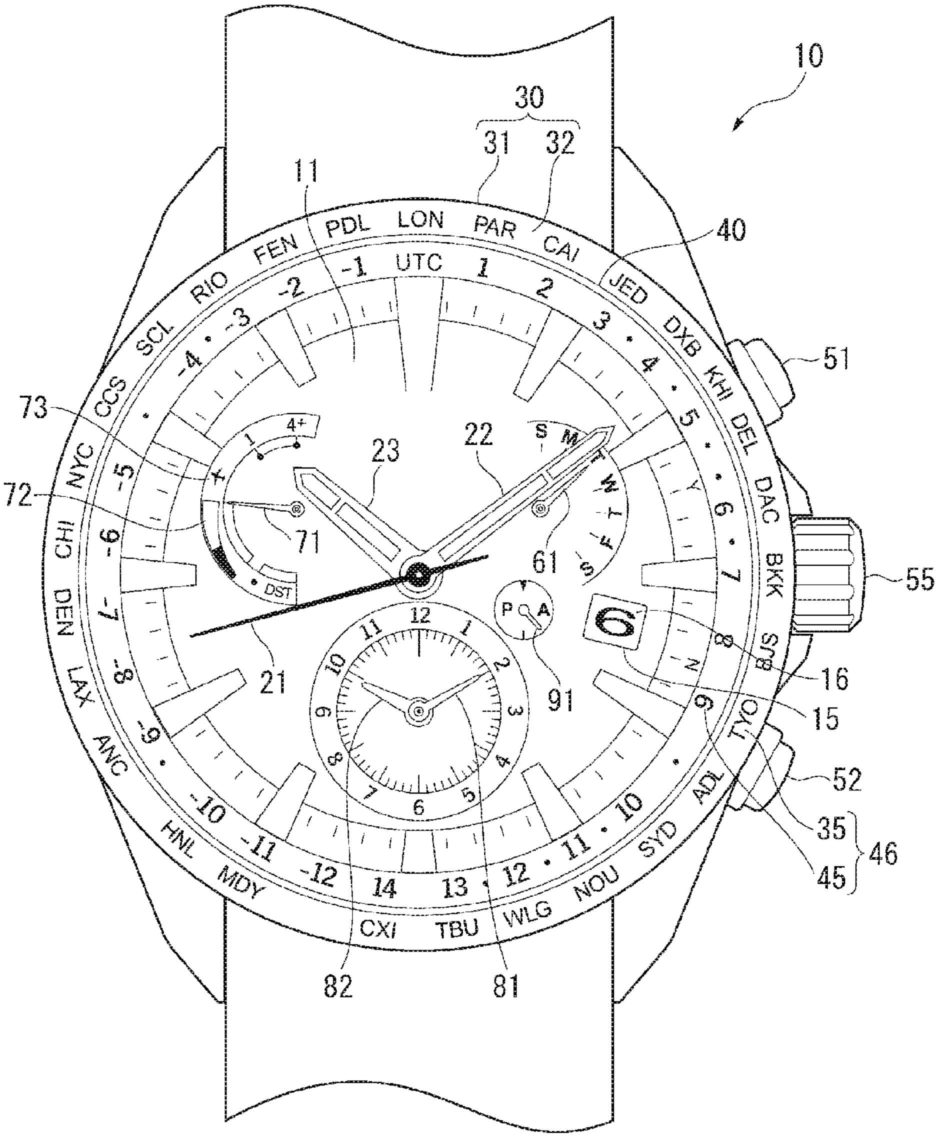
FIG. 2 is a front view of an electronic timepiece.
Figure 3:
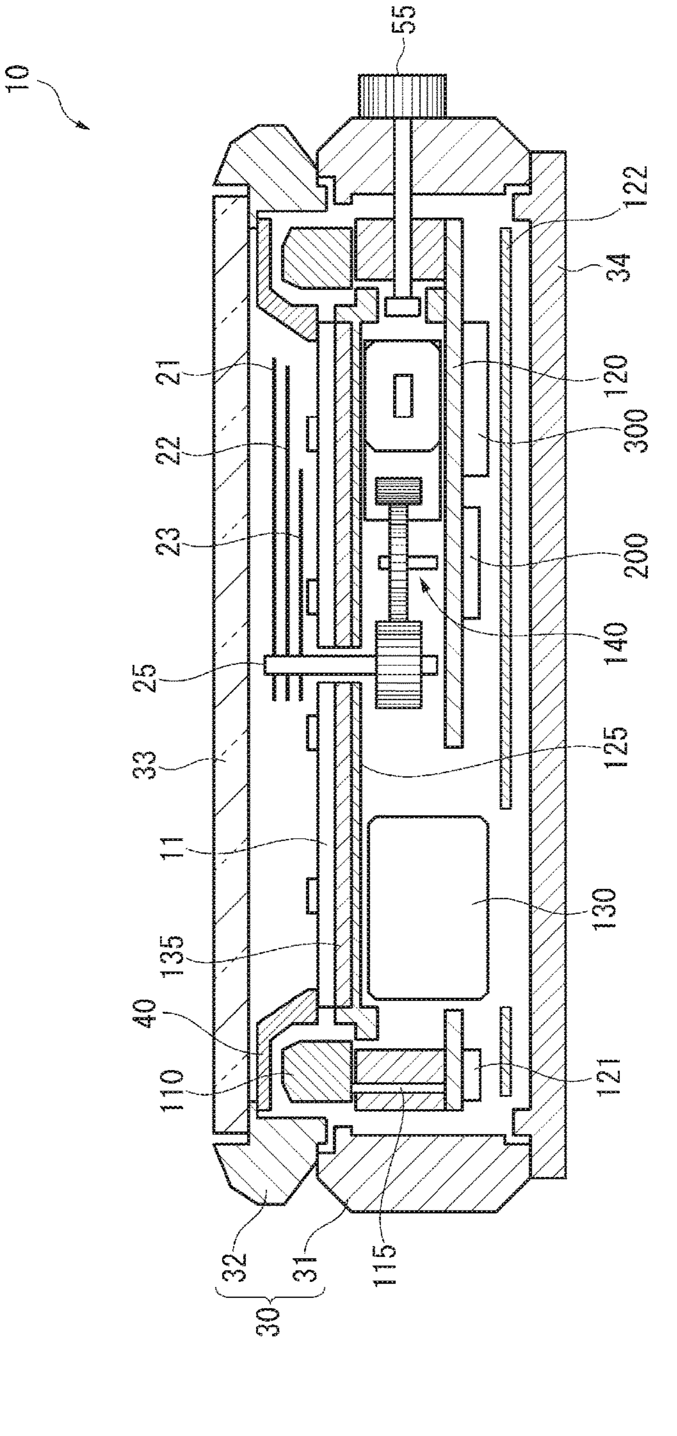
FIG. 3 is a section view of a electronic timepiece.

FIG. 2 is a front view of the electronic timepiece 10, and FIG. 3 is a basic section view of the electronic timepiece 10.

As shown in FIG. 2 and FIG. 3, the electronic timepiece 10 has an external case 30, crystal 33, and back cover 34.

The external case 30 includes a ceramic bezel 32 affixed to a cylindrical case member 31 made of metal. A round dial 11 used as the time display is held inside the inside circumference of the bezel 32 by means of a plastic dial ring 40.

Disposed around the center of the dial 11 in the side of the external case 30 are a button A 51 at 2:00, a button B 52 at 4:00, and a crown 55 at 3:00.

As shown in FIG. 3, of the two main openings in the external case 30, the opening on the face side is covered by the crystal 33 held by the bezel 32, and the opening on the back is covered by the metal back cover 34.

Inside the external case 30 are the dial ring 40 attached to the inside circumference of the bezel 32; an optically transparent dial 11; a center pivot 25 passing through the dial 11; hands 21, 22, 23 that rotate on the center pivot 25; and a drive mechanism 140. The drive mechanism 140 drives each of the hands 21, 22, 23, 61, 71, 81, 82, 91 and the calendar wheel 16 shown in FIG. 2.

The center pivot 25 passes through the dial in the plane center of the external case 30, and is aligned with the center axis between the front and back of the timepiece.

The dial ring 40 has a flat portion around the outside that contacts the inside circumference surface of the bezel 32 and is parallel to the crystal 33, and a beveled portion that slopes from the inside circumference part of the flat portion down to the dial 11 and contacts the dial 11. The dial ring 40 is shaped like a ring when seen in plan view, and is conically shaped when seen in section. The flat part and beveled part of the dial ring 40, and the inside circumference surface of the bezel 32, create a donut-shaped space inside of which a ring-shaped antenna 110 is housed.

The dial 11 is a round disk for indicating the time inside the external case 30, is made of plastic or other light-transparent material, and is disposed inside of the dial ring 40 with the hands 21, 22, 23 between the dial 11 and the crystal 33.

A solar panel 135, which is a photovoltaic power generator, is disposed between the dial 11 and a main plate 125 to which the drive mechanism 140 is disposed. The solar panel 135 is a round flat panel having plural solar cells (photovoltaic devices) that convert light energy to electrical energy (power) connected in series. Through-holes through which the center pivot 25, and the pivots (not shown in the figure) of the other hands 61, 71, 81, 82, 91 pass, and an aperture for the calendar window 15, are formed in the dial 11, solar panel 135, and main plate 125.

The drive mechanism 140 is disposed to the main plate 125, and is covered by a circuit board 120 from the back side. The drive mechanism 140 includes a stepper motor and wheel train, and drives the hands by the stepper motor rotationally driving the center pivot 25 and such through the wheel train.

The drive mechanism 140 more specifically includes first to sixth drive mechanisms. The first drive mechanism drives the minute hand 22 (minute hand) and hour hand 23 (hour hand) that indicate the hour and minute of the first time (local time). The other hands 21, 61, 71, 81, 82, 91 shown in FIG. 2 are driven by similar drive mechanisms (not shown in the figure). More specifically, the second drive mechanism drives the second hand 21 indicating the seconds of the first time; the third drive mechanism drives the hand 61 that indicates the weekday; the fourth drive mechanism drives the hand 71 that indicates the operating mode; the fifth drive mechanism drives the hand 81 (minute hand) and hand 82 (hour hand) that indicate the minute and hour of a second time (home time), and the hand 91 that indicates whether the second time is ante meridiem (a.m.) or post meridiem (p.m.); and the sixth drive mechanism that drives the calendar wheel 16 visible through the calendar window 15.

The circuit board 120 has a reception device (GPS module) 121, a control device (controller) 300, and a storage device 200. The circuit board 120 and antenna 110 connect through an antenna connection pin 115. A circuit cover 122 covers the reception device 121, control device 300, and storage device 200 from the back cover 34 side of the circuit board 120 to which these parts are disposed. A lithium ion battery or other type of storage battery 130 is disposed between the ground plate 125 and the back cover 34. The storage battery 130 is charged with power produced by the solar panel 135.

Display Mechanism of the Electronic Timepiece

As shown in FIG. 2, a scale of 60 minute markers is formed on the inside circumference side of the dial ring 40 around the outside edge of the dial 11. When normally displaying the time, the second of the first time is indicated by the second hand 21, the minute of the first time is indicated by the minute hand 22, and the hour of the first time is indicated by the hour hand 23 using these markers. Note that because the second of the first time is the same as the second of the second time described below, the user can also know the second of the second time by reading the second hand 21.

Note that an alphabetic Y is disposed at the 12 minute marker of the dial ring 40, and an N is disposed at the 18 minute marker. These letters denote the result of receiving (acquiring) information based on the satellite signals from the GPS satellites 100, Y meaning that reception (acquisition) was successful, and N meaning that reception (acquisition) failed. The second hand 21 points to either Y or N to indicate the result of satellite signal reception. Note that the reception result is indicated when the button A 51 is pressed for less than 3 seconds.

A hand 61 is disposed to a small dial offset from the center of the dial 11 near 2:00. The letters S, M, T, W, T, F, S denoting the seven days of the week are disposed in an arc around the axis of rotation of the hand 61. The hand 61 points to one of the letters S, M, T, W, T, F, S to indicate the day of the week.

Another hand 71 is disposed to a small dial offset from the center of the dial 11 near 10:00. The markers around the outside of the axis of rotation of the hand 71 are described below, but it should be noted that referring to the direction of n:00 (where n is a natural number) below means the position of that time on an imaginary clock dial centered on the pivot of the hand 71.

DST and a black dot are disposed in the area between 6:00 and 7:00 on the imaginary dial around the hand 71 DST denotes daylight saving time. The hand 71 points to either DST or the dot depending on whether or not the electronic timepiece 10 is set to the DST mode (DST meaning the daylight saving time mode is on, and the black dot meaning the DST mode is off).

A sickle-shaped symbol 72 that is wide at the 9:00 end and narrows to the 8:00 end is formed in the area from 8:00 to 9:00 along the outside of the range of hand 71 rotation. This symbol 72 is used as a reserve power indicator for the storage battery 130 (FIG. 3), and the power reserve is indicated by the hand 71 pointing to the position appropriate to the reserve power in the battery. Note that this hand 71 normally points to a position in the symbol 72.

An airplane symbol 73 is provided at 10:00 on the hand 71 dial. This symbol is used to indicate the airplane mode. Receiving satellite signals is prohibited by law when a commercial plane is taking off and landing. By pointing to the airplane symbol 73, the hand 71 indicates the airplane mode is set and satellite signals will not be received.

The number 1 and symbol 4+ are at 11:00 and 12:00 on the imaginary dial of the hand 71. These symbols are used in the satellite signal reception mode. The hand 71 points to 1 when GPS time information is received and the internal time adjusted (in the timekeeping mode), and points to 4+ when receiving GPS time information and orbit information, calculating the positioning information indicating the current location, and correcting the internal time and time zone (in the positioning mode) as described below.

Hands 81, 82 are disposed to a small dial offset toward 6:00 from the center of the dial 11. The large hand 81 is the minute hand of the second time, and the other hand 82 is the hour hand of the second hand.

Hand 91 is disposed to a position offset toward 4:00 from the center of the dial 11, and indicates whether the second time is ante meridiem (a.m.) or post meridiem (p.m.).

The calendar window 15 is a small rectangular opening in the dial 11 through which the date (number) printed on the calendar wheel 16 can be seen. This number denotes the day value of the current date.

Time difference information 45 indicating the time difference to UTC (Coordinated Universal Time) is denoted by numbers and non-numeric symbols around the inside circumference of the dial ring 40. Numeric time difference information 45 denotes the time difference in integer values, and symbolic time difference information 45 indicates the time difference when the time difference is not an integer value. The time difference between the first time indicated by hands 21, 22, 23 and UTC can be checked by pressing the button B 52 and reading the time difference information 45 pointed to by the second hand 21.

City name information 35 is disposed beside the time difference information 45 on the bezel 32 surrounding the dial ring 40. The city name information 35 denotes the name of a city located in the time zone that uses the standard time corresponding to the time difference indicated by the time difference information 45 on the dial ring 40. The markers of the time difference information 45 and the city name information 35 embody a time zone display 46. The time zone display 46 in this embodiment has the same number of time zone markers as there are time zones used in the world today.

Internal Configuration of Electronic Timepiece

Figure 4:
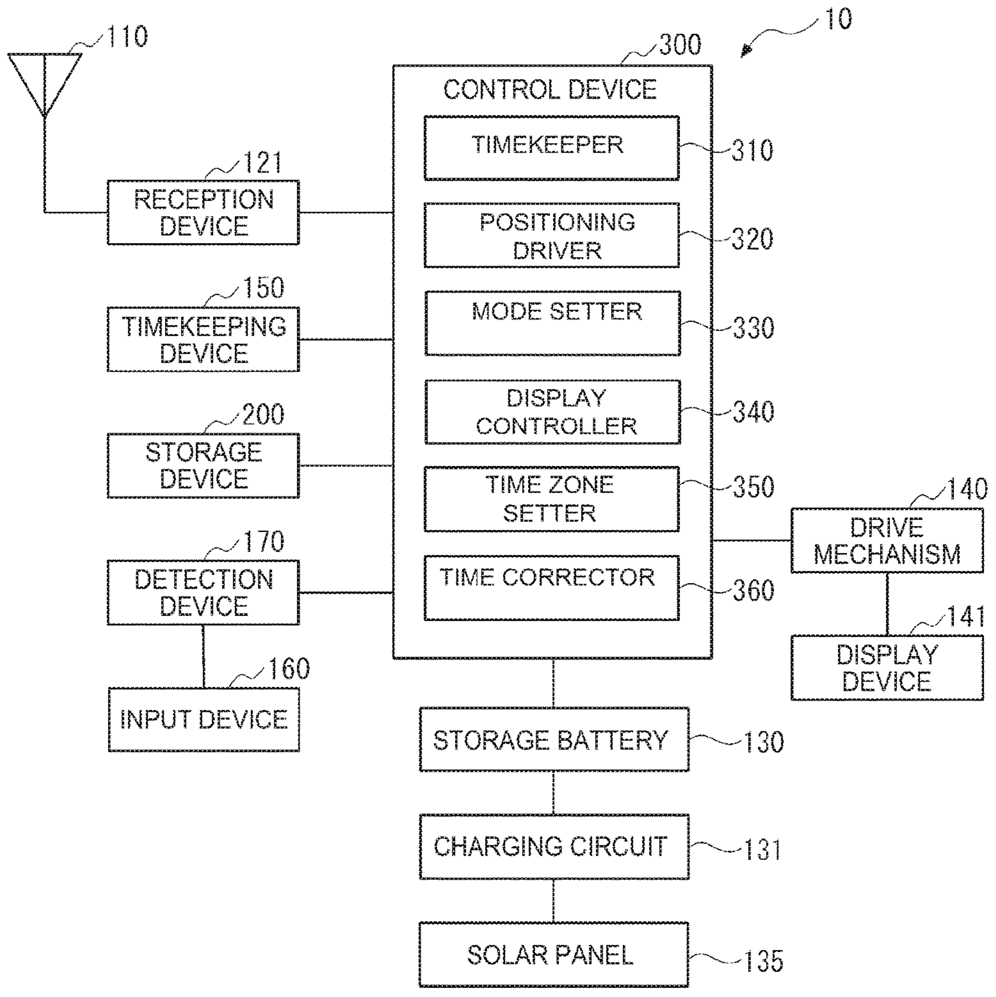
FIG. 4 is a control block diagram.

FIG. 4 is a control block diagram of the electronic timepiece 10.

As shown in FIG. 4, the electronic timepiece 10 has a control device 300 comprising a CPU, a storage device 200 including RAM (random access memory) and ROM (read-only memory), a reception device 121 (GPS module), a timekeeping device 150, an input device 160, a detection device 170, the drive mechanism 140, and a display device 141. These devices communicate with each other over a data bus.

The electronic timepiece 10 has a rechargeable storage battery 130 (see FIG. 3) as the power source. The storage battery 130 is charged by power produced by the solar panel 135 through a charging circuit 131.

Input Device

The input device 160 includes the crown 55, button A 51, and button B 52 shown in FIG. 2. The input device 160 is an example of the interface.

Detection Mechanism

The detection device 170 detects user operations instructing executing specific processes based on pushing and releasing the buttons 51, 52 or pulling and pushing the crown 55 out and in, and outputs an operating signal corresponding to the detected operation to the control device 300. That is, operating signals output from the detection device 170 are input to the control device 300.

More specifically, when button A 51 is depressed for less than 3 seconds, the detection device 170 a fourth operation, which instructs displaying the reception result, and outputs a fourth operation signal when the fourth operation is detected.

When button A 51 is depressed for more than 3 second and less than 6 seconds, the detection device 170 a third operation, which instructs starting reception in the timekeeping mode, and outputs a third operation signal when the third operation is detected.

When button A 51 is depressed for more than 6 seconds, the detection device 170 a second operation, which instructs starting reception in the positioning mode, and outputs a second operation signal when the second operation is detected.

When the crown 55 is at the 0 stop pushed completely in and button B 52 is pressed, the detection device 170 detects a "confirm time zone operation" that instructs setting the time zone confirmation mode described below, and outputs a confirm time zone signal when the confirm time zone operation is detected. When button B 52 is pressed again, the detection device 170 detects a stop time zone confirmation operation to end the time zone confirmation mode, and outputs a stop time zone confirmation signal to end the time zone confirmation mode.

When the crown 55 is pulled out to the first stop, the detection device 170 detects a time zone setting operation that instructs entering the time zone setting mode, and outputs a set time zone signal when the time zone setting operation is detected. When the crown 55 is then pushed back into the 0 stop position, the detection device 170 detects a stop time zone setting operation instructing ending the time zone setting mode, and outputs a stop setting time zone signal to cancel the time zone setting mode.

Note that the confirm time zone operation described below is the first operation.

Display Device

The display device 141 of the electronic timepiece 1 is embodied by the dial 11, dial ring 40, bezel 32, and hands 21, 22, 23, 61, 71, 81, 82, 91 shown in FIG. 2. The display device 141 is an example of the display.

Reception Device

The reception device 121 is connected to the antenna 110, processes satellite signals received through the antenna 110, and acquires GPS time information and positioning information. The antenna 110 receives satellite signal waves that are transmitted from the GPS satellites 100 (FIG. 1) orbiting the Earth on known orbits, and pass through the crystal 33 and dial ring 40 shown in FIG. 3. The reception device 121 is an example of the receiver.

While not shown in the figure, the reception device 121 includes an RF (radio frequency) receiver that receives and converts satellite signals transmitted from the GPS satellites 100 (FIG. 1) to digital signals; a baseband demodulator that executes a reception signal correlation process and demodulates the navigation data message; and a data acquisitor that acquires GPS time information and positioning information from the navigation data message (satellite signals) demodulated by the baseband demodulator.

Timekeeping Device

The timekeeping device 150 includes a crystal oscillator that is driven by power stored in the storage battery 130, and updates the time data using a reference signal based on the oscillation signal from the crystal oscillator.

Storage Device

Figure 5:
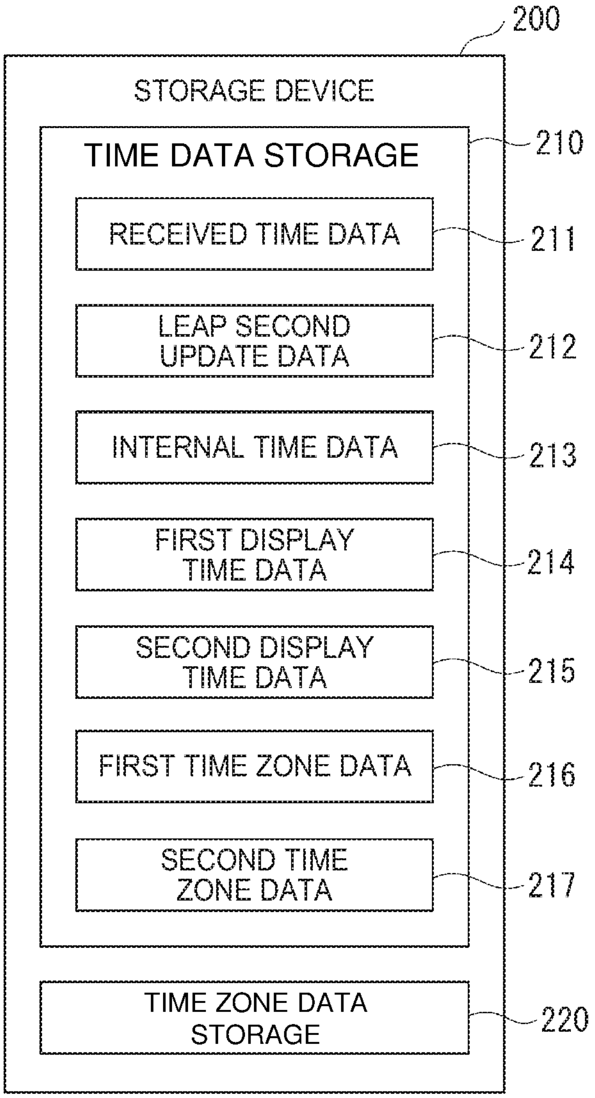
FIG. 5 illustrates the data structure of the storage device in a preferred embodiment.

The storage device 200, as shown in FIG. 5, includes a time data storage 210 and a time zone data storage 220.

Stored in the time data storage 210 are received time data 211, leap second update data 212, internal time data 213, first display time data 214, second display time data 215, first time zone data 216, and second time zone data 217.

The received time data 211 stores the time information (GPS time) acquired from GPS satellite signals. The received time data 211 is normally updated every second by the timekeeping device 150, and when a satellite signal is received, the acquired time information (GPS time) is stored.

The leap second update data 212 stores at least data about the current leap second. More specifically, the current leap second value, the week number of the leap second event, the day number of the leap second event, and the future leap second value, are stored on page 18 in subframe 4 of the GPS satellite signal as data related to the leap second. Of these values, at least the current leap second value is stored in the leap second update data 212.

The internal time data 213 stores internal time information. More specifically, the internal time data 213 is updated based on the GPS time stored in the received time data 211 and the current leap second value stored in the leap second update data 212. As a result, UTC is stored in the internal time data 213. When the received time data 211 is updated by the timekeeping device 150, the internal time data is also updated.

The sum of the internal time stored in the internal time data 213, and the time zone data (time difference information) of the first time zone data 216 is stored in the first display time data 214.

The first time zone data 216 is set to the time zone that is manually selected by the user or is acquired by reception in the navigation mode. The time expressed by the first display time data 214 is the first time that is displayed by the hands 21, 22, 23.

The second display time data 215 is set to the internal time expressed by the internal time data 213 and the time zone set in the second time zone data 217. The second time zone data 217 is the time zone that is manually set by the user. The time expressed by the second display time data 215 is the second time displayed by the hands 81, 82, 91.

The time zone data storage 220 relationally stores positioning information (latitude, longitude) to time zone data (time difference information). As a result, when positioning information is acquired in the navigation mode, the control device 300 can acquire the time zone based on the positioning information (latitude, longitude).

City names and time zone data are also relationally stored in the time zone data storage 220. As a result, when the user uses the crown 55 to select the name of and acquire the current time in a particular city, the control device 300 searches the time zone data storage 220 for the city name selected by the user, acquires the time zone data for that city name, and sets the first time zone data 216 or second time zone data 217 accordingly. A method of manually setting the time zone is described below.

Control Device

The control device 300 is embodied by a CPU that controls the electronic timepiece 10. The control device 300 includes a timekeeper 310, a positioning driver 320, a mode setter 330, a display controller 340, a time zone setter 350, and a time corrector 360. The function of each element is described below by the process executed by the control device 300.

Figure 6:
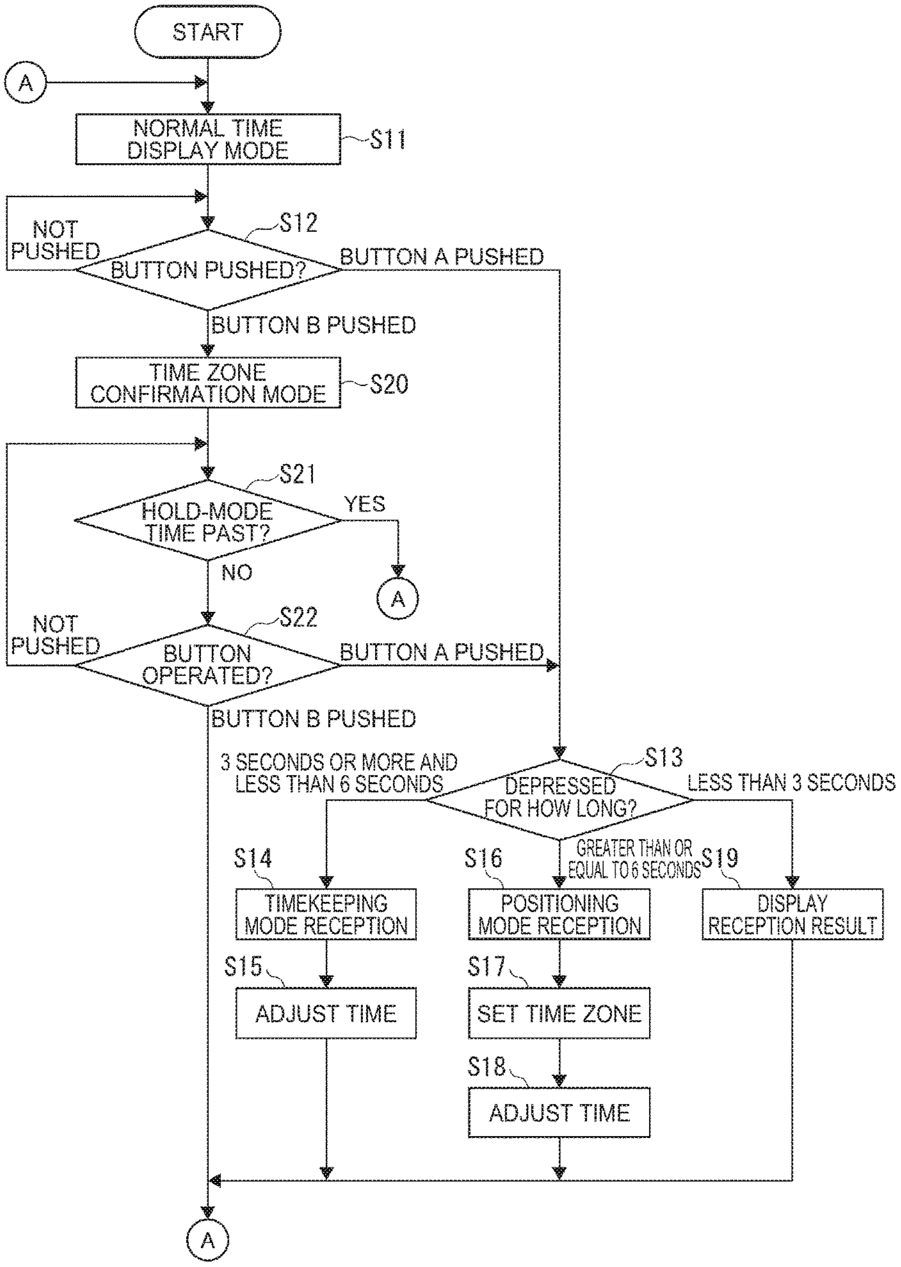
FIG. 6 is a flow chart describing the operation of the control device in a preferred embodiment.

The processes executed by the control device 300 when a button is pressed are described below. FIG. 6 is a flow chart of a process executed by the control device 300.

In the normal time display mode (S11), the control device 300 continuously detects if a button was operated based on the operation signal input from the detection device 170 (S12). Note that in the normal time display mode, the crown 55 is at the 0 stop position.

If the control device 300 determines the button A 51 was pressed in the normal time display mode (S12), the device 300 determines how long the button A 51 is continuously pressed (S13).

If in the normal time display mode the button A 51 is pressed for 3 seconds or more and less than 6 seconds (the operation forcing reception in the timekeeping mode) and the third operation signal is received from the detection device 170, the timekeeper 310 operates the reception device 121 and runs the reception process in the timekeeping mode (S14).

When the reception process runs in the timekeeping mode, the reception device 121 locks onto to at least one GPS satellite 100, receives satellite signals transmitted from that GPS satellite 100, and acquires time information.

The display controller 340 also sets the second hand 21 to the 0 second position, and sets the hand 71 to point to 1, thereby indicating that the reception process is running in the timekeeping mode. Because the second hand 21 points to the 0 second position, the second hand 21 does not point to Y or N. The user will therefore not mistakenly believe that the reception result is being indicated because the second hand 21 will not coincidentally point to Y or N. When the reception process ends, the display controller 340 sets the second hand 21 to Y or N for a specific time to indicate the reception result.

If acquiring the time information is successful, the time corrector 360 stores the acquired time information in the received time data 211. As a result, the internal time data 213, first display time data 214, and second display time data 215 are corrected (S15).

Next, the device 300 returns to the normal time display mode in S11, and the display controller 340 sets the second hand 21 to point to the second of the first time.

If in the normal time display mode the button A 51 is pressed for 6 seconds or more (the operation forcing reception in the navigation mode) and the second operation signal is received from the detection device 170, the positioning driver 320 operates the reception device 121 and runs the reception process in the navigation mode (S16).

When the reception process runs in the navigation mode, the reception device 121 locks onto to at least three, and preferably four or more, GPS satellites 100, receives satellite signals transmitted from those GPS satellites 100 and acquires positioning information. The reception device 121 also acquires time information when receiving the satellite signals.

The display controller 340 also moves the second hand 21 to the 30 second position and moves the hand 71 to the 4+ position, thereby indicating that the reception process is running in the navigation mode. Because the second hand 21 points to the 30 second position, the second hand 21 does not point to Y or N. The user will therefore not mistakenly believe that the reception result is being indicated because the second hand 21 will not coincidentally point to Y or N. When the reception process ends, the display controller 340 sets the second hand 21 to Y or N for a specific time to indicate the reception result.

If acquisition of positioning information is successful in the reception process, the time zone setter 350 sets the time zone data based on the acquired positioning information (latitude, longitude) (S17). More specifically, the time zone setter 350 selects and acquires the time zone data (time zone information, that is, the time difference information) corresponding to the positioning information from the time zone data storage 220, and stores (sets) the time zone data in the first time zone data 216.

For example, because Japan Standard Time (JST) is nine hours ahead of UTC (UTC+9), if the acquired positioning information is a location in Japan, the time zone setter 350 reads the time difference (+9 hours) for JST from the time zone data storage 220, and stores this time difference in the first time zone data 216.

If acquisition of time information is successful in the reception process, the time corrector 360 stores the acquired time information in the received time data 211. As a result, the internal time data 213, first display time data 214, and second display time data 215 are corrected.

The time corrector 360 then corrects the first display time data 214 using the first time zone data 216 (S18). As a result, the first display time data 214 is adjusted to the internal time data 213 (UTC) plus the value of the time zone data.

Next, the device 300 returns to the normal time display mode in S11, and the display controller 340 sets the second hand 21 to the second value of the first time.

If the button A 51 is pressed for less than 3 seconds (the display reception result operation is performed) in the normal time display mode and the fourth operation signal is received from the detection device 170, the display controller 340 moves the second hand 21 to the Y or N to indicate the result of the last reception process (S19). The display controller 340 also sets the hand 71 to 1 or 4+ to indicate the reception mode in the last reception process. Next, if button B 52 is pressed or the display time (such as 5 seconds) passes, the control device 300 returns to S11 and resumes the normal time display mode, and the display controller 340 sets the second hand 21 to the second of the first time.

Figure 7:
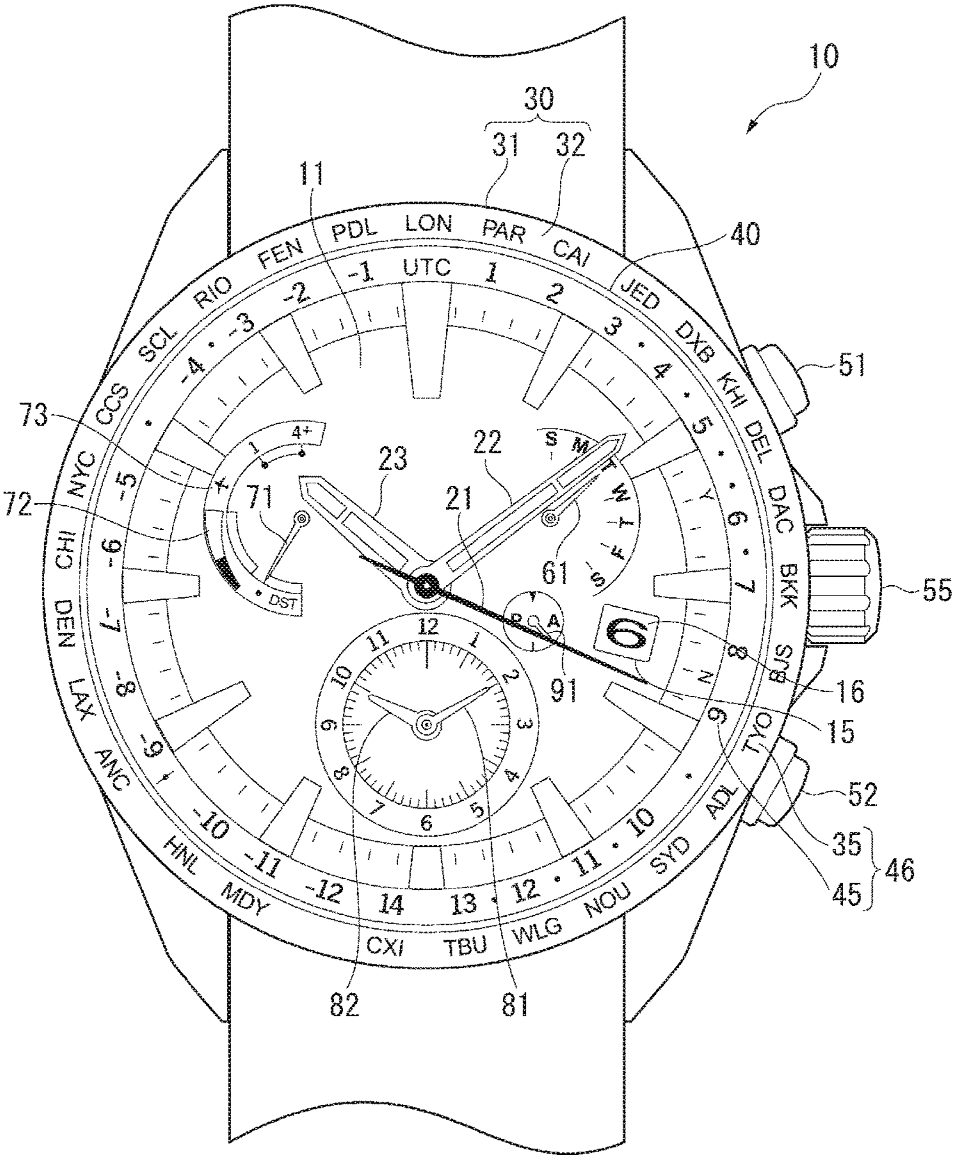
FIG. 7 illustrates an example of the display in the time zone confirmation mode of the electronic timepiece according to a preferred embodiment.

If the button B 52 is pressed (the confirm time zone operation is performed) in the normal time display mode and the confirm time zone signal is received from the detection device 170, the mode setter 330 enters the time zone confirmation mode (S20). The display controller 340 then displays the time zone data that is stored in the first time zone data 216 by setting the second hand 21 to a particular marker on the time zone display 46 as shown in FIG. 7. The display controller 340 also indicates the daylight saving time setting by setting the hand 71 to DST or the black dot.

After setting the time zone confirmation mode, the mode setter 330 watches if a previously set hold-mode time (such as 5 seconds) has past (S21).

If S21 returns NO, the device 300 determines the button operation based on the operation signal input from the detection device 170 (S22). If a button is not operated, the device 300 returns to S21. More specifically, the control device 300 repeats steps S21 and S22 until the hold-mode time passes or a button is operated.

In the time zone confirmation mode, if button A 51 is pressed while the time zone data is indicated (S22), the control device 300 determines in S13 how long the button A 51 is held continuously depressed.

If button A 51 is pressed continuously for 3 seconds or more and less than 6 seconds while the time zone data is indicated in the time zone confirmation mode and the third operation signal is received from the detection device 170, the timekeeper 310 runs the reception process in the timekeeping mode in S14.

Figure 8:
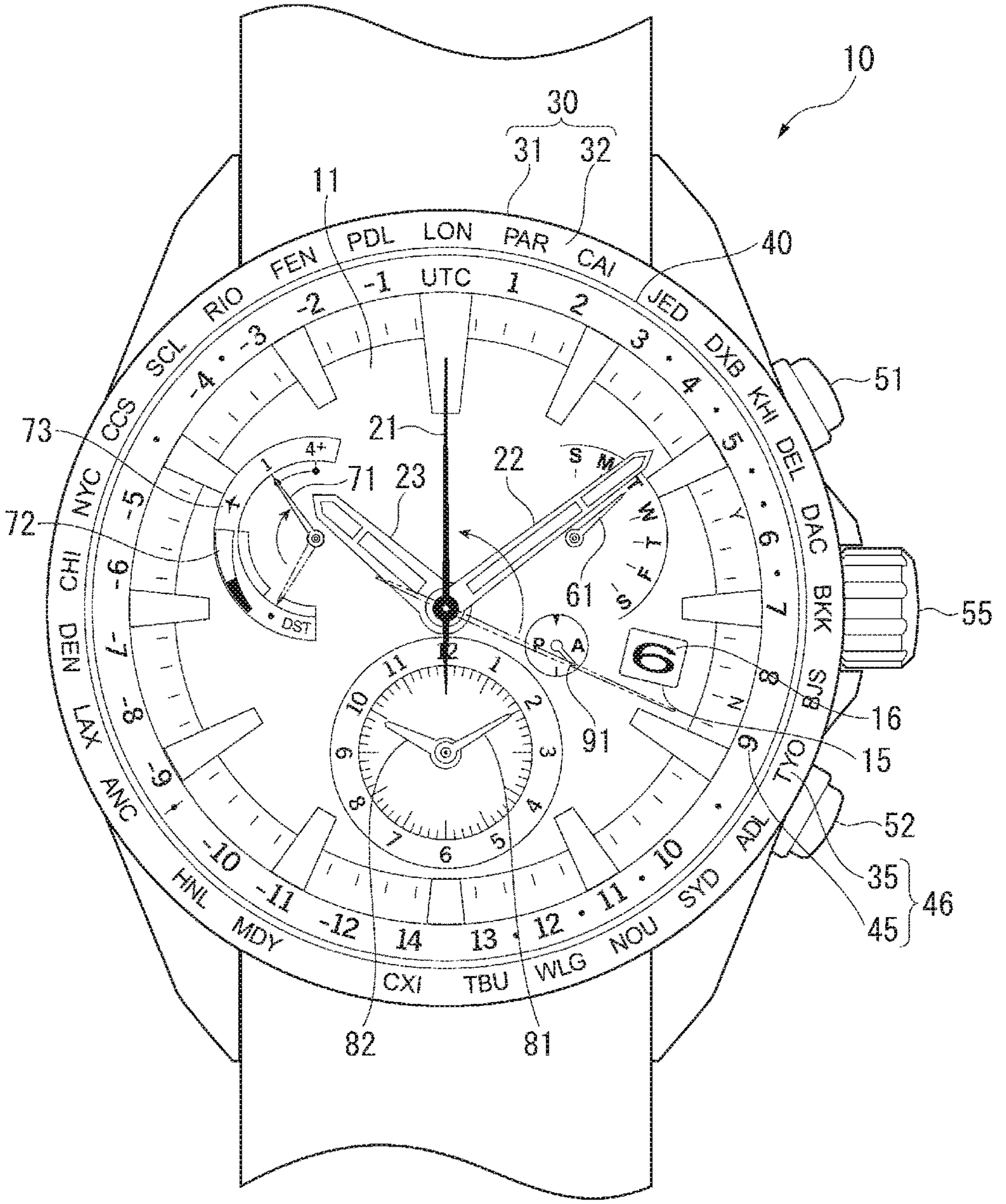
FIG. 8 illustrates an example of the display in the reception process when in the timekeeping mode of the electronic timepiece according to a preferred embodiment.
Figure 9:
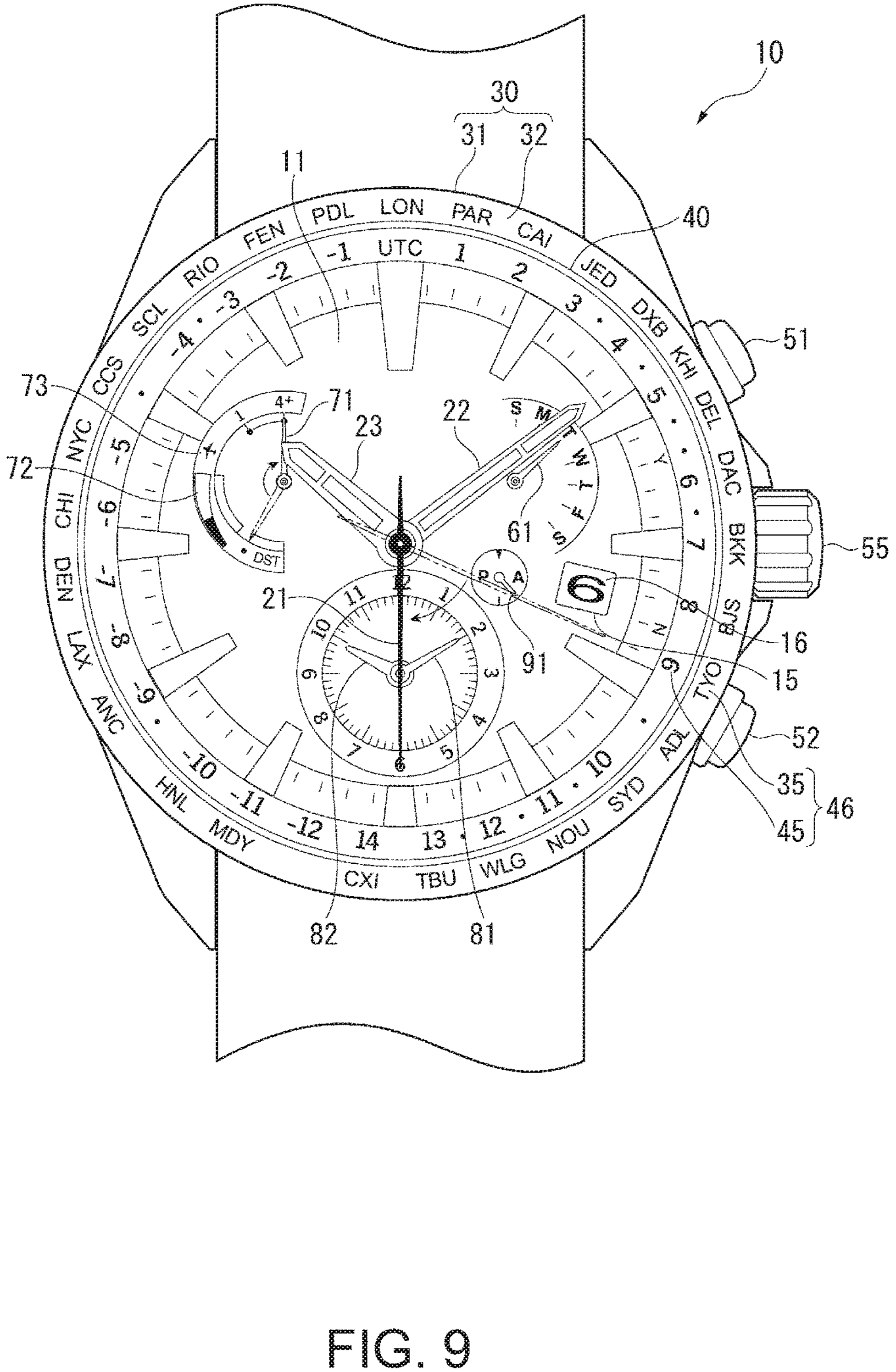
FIG. 9 illustrates an example of the display in the reception process when in the navigation mode of the electronic timepiece according to a preferred embodiment.

As shown in FIG. 8, the display controller 340 indicates the reception process is running in the timekeeping mode by moving the second hand 21 that was indicating the time zone data to the 0 second position and setting the hand 71 to the 1.

When the reception process ends, the display controller 340 displays the reception result with the second hand 21 for a specific time.

When acquisition of time information is successful, the time corrector 360 stores the acquired time information in the received time data 211 in S15. As a result, the internal time data 213, first display time data 214, and second display time data 215 are corrected.

Next, the device 300 returns to the normal time display mode in S11, and the display controller 340 sets the second hand 21 to point to the second of the first time.

If in the normal time display mode button A 51 is pressed for 6 seconds or more (the operation forcing reception in the navigation mode) and the second operation signal is received from the detection device 170, the positioning driver 320 executes the reception process in the navigation mode in S16.

The display controller 340 indicates that the reception process is running in the navigation mode by moving the secondhand 21 that was indicating the time zone to the 30 second position and moving the hand 71 to the 4+ position.

When the reception process ends, the display controller 340 displays the reception result with the second hand 21 for a specific time.

If acquisition of positioning information is successful in the reception process, the time zone setter 350 sets the time zone data based on the acquired positioning information (latitude, longitude) in S17.

If acquisition of time information is successful in the reception process, the time corrector 360 stores the acquired time information in the received time data 211 in S18. As a result, the internal time data 213, first display time data 214, and second display time data 215 are corrected. The time corrector 360 also corrects the first display time data 214 using the first time zone data 216.

Next, the device 300 returns to the normal time display mode in S11, and the display controller 340 sets the second hand 21 to point to the second of the first time.

Figure 10:
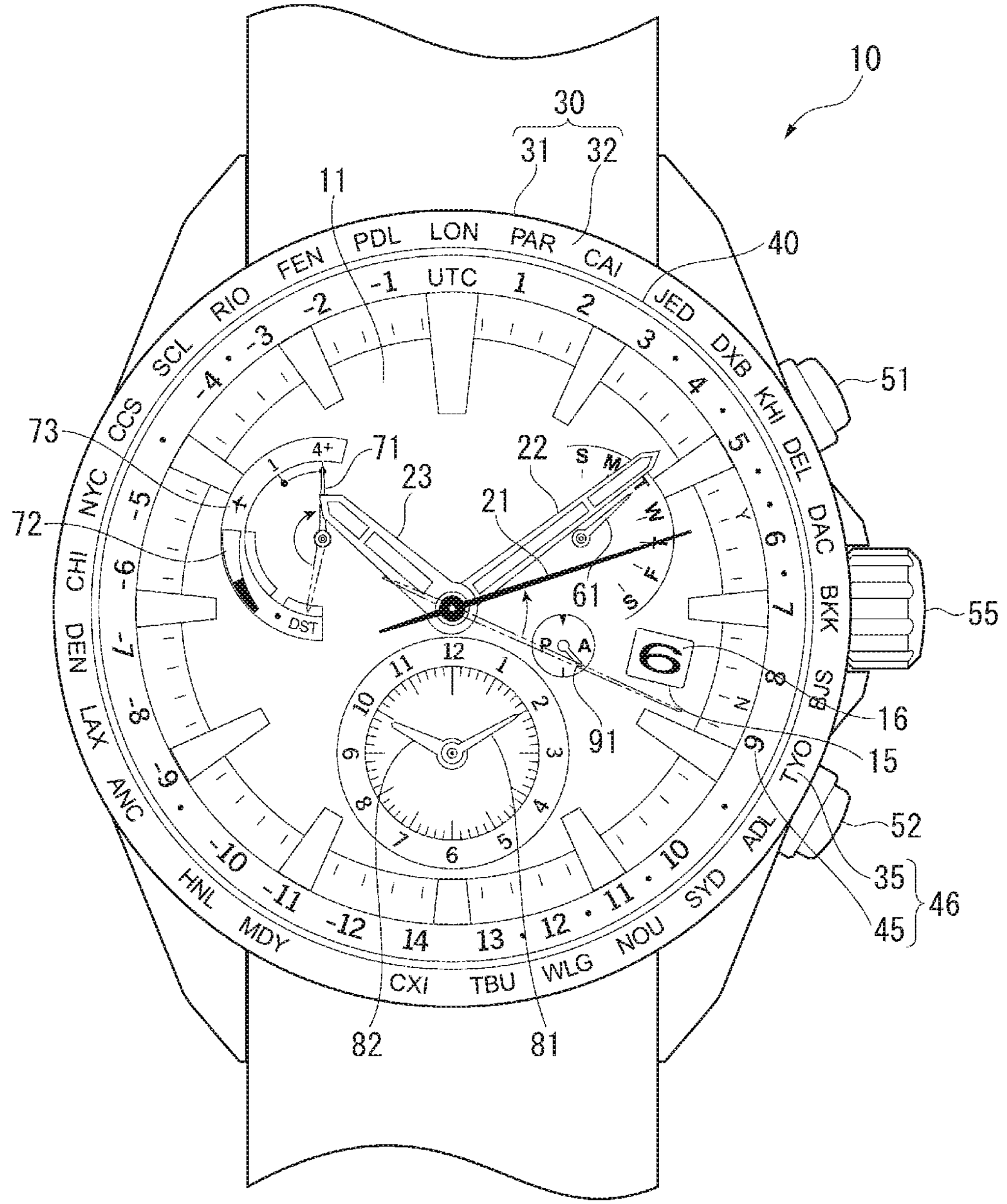
FIG. 10 illustrates an example of the display showing the result of the reception process in the electronic timepiece according to a preferred embodiment.

If the button A 51 is pressed for less than 3 seconds (the display reception result operation) in the time zone confirmation mode and the fourth operation signal is received from the detection device 170, the display controller 340 indicates the result of the last reception process in S19 by moving the second hand 21 that was indicating the time zone to the Y or N as shown in FIG. 10. The display controller 340 also sets the hand 71 to 1 or 4+ to indicate the reception mode the last time the reception process ran. Next, if button B 52 is pressed or the display time (such as 5 seconds) passes, the control device 300 returns to S11 and resumes the normal time display mode, and the display controller 340 sets the second hand 21 to the second of the first time.

If S21 returns YES or button B 52 is pressed (stop time zone confirmation operation) in the time zone confirmation mode and the stop time zone confirmation signal is received from the detection device 170, the mode setter 330 exits the time zone confirmation mode, the device 300 returns to the normal time display mode, and the display controller 340 sets the second hand 21 that was indicating the time zone to the second of the first time.

Time Zone Setting Process

The time zone setting process of the control device 300 is described next.

Figure 11:
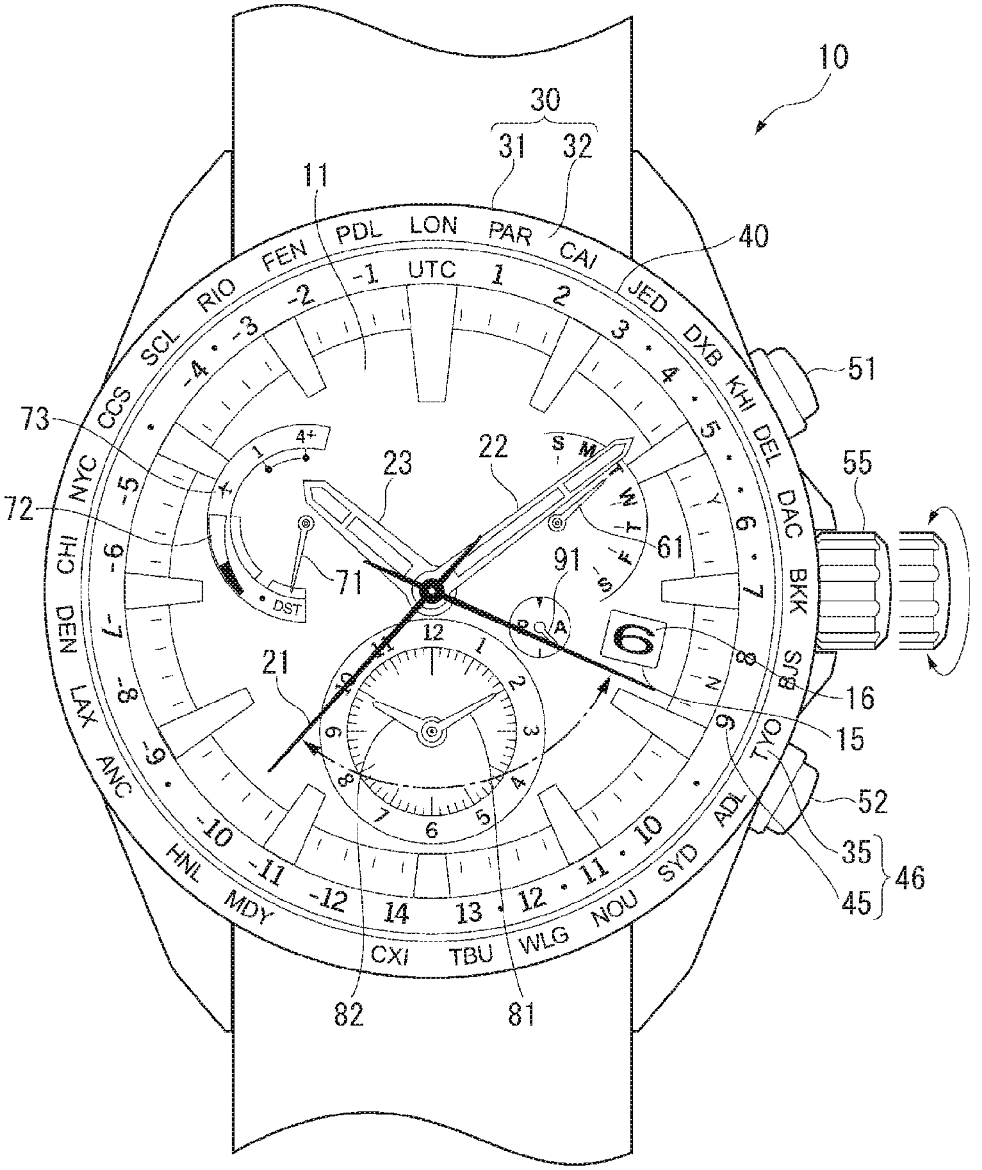
FIG. 11 illustrates an example of the display in the time zone setting mode of the electronic timepiece according to a preferred embodiment.

As shown in FIG. 11, when the crown 55 is pulled out to the first stop, that is, when the set time zone operation is performed, and the set time zone signal is received from the detection device 170, the mode setter 330 enters the time zone setting mode. The display controller 340 then displays the time zone data stored (set) in the first time zone data 216 by moving the second hand 21 to the appropriate marker on the time zone display 46. When the button B 52 is then pushed in, the display controller 340 sets the second hand 21 to indicate the time zone data stored in the second time zone data 217. The time for which to set the time zone can be switched between the first time zone data 216 and second time zone data 217 by thus pushing the button B 52 and changing the display.

The desired time zone can then be selected by turning the crown 55 (change time zone operation) to set the second hand 21 to the marker of the desired time zone on the time zone display 46.

The time zone setter 350 then sets the time zone data based on the time zone display 46 marker indicated by the second hand 21. More specifically, the time zone setter 350 acquires the time zone data corresponding to the time zone display 46 marker indicated by the second hand 21 from the time zone data storage 220. If the first time zone data 216 was selected for setting, the acquired time zone data is stored (set) in the first time zone data 216, and if the second time zone data 217 was selected for setting, the acquired time zone data is stored (set) in the second time zone data 217.

The time zone data is then selectively set in the first time zone data 216 or second time zone data 217.

The time corrector 360 then corrects the first display time data 214 or the second display time data 215 using the first time zone data 216 or the second time zone data 217.

More specifically, each time the crown 55 is turned and the second hand 21 moves forward or back to a different marker on the time zone display 46, the first time or second time that is displayed changes. The user than therefore easily change the time zone setting while reading the first time or the second time.

When the crown 55 is then pushed back into the 0 stop position (stop time zone setting operation) and a stop setting time zone signal is received from the detection device 170, the mode setter 330 ends the time zone setting mode, and the control device 300 returns to the normal time display mode. The time zone data is thus set.

When the time zone setting mode is set in this embodiment, the positioning driver 320 and timekeeper 310 do not run the reception process even if the second operation (operation forcing reception in the navigation mode) or the third operation (force reception in the timekeeping mode) is performed. The display controller 340 also does not display the reception result even if the fourth operation is performed.

Effect of the Embodiment

To make the positioning driver 320 run the reception process after executing the confirm time zone operation and displaying the set time zone on the display device 141, the user can simply perform the second operation while the time zone data is displayed, does not need to use the input device 160 to end the time zone data display, and operation is simple. Furthermore, because operating time can be shortened, the reception process can be executed quickly in the navigation mode, and the time can be quickly adjusted.

The operation forcing reception in the navigation mode (pressing button A 51 for at least 6 seconds) is the same in the time zone confirmation mode and the normal time display mode. As a result, it is easier for the user to remember the operating procedure than when the operation to start reception in the navigation mode is different in the time zone confirmation mode and the normal time display mode.

To make the timekeeper 310 run the reception process after executing the confirm time zone operation and displaying the set time zone on the display device 141, the user can simply perform the third operation while the time zone data is displayed, does not need to use the input device 160 to end the time zone data display, and operation is simple. Furthermore, because operating time can be shortened, the reception process can be executed quickly in the timekeeping mode, and the time can be quickly adjusted.

The operation forcing reception in the timekeeping mode (pressing button A 51 for 3 seconds or more and less than 6 seconds) is the same in the time zone confirmation mode and the normal time display mode. As a result, it is easier for the user to remember the operating procedure than when the operation to start reception in the timekeeping mode is different in the time zone confirmation mode and the normal time display mode.

When the confirm time zone operation is performed, the second hand 21 points to the currently set time zone, and the user can therefore know what time zone is set by reading the second hand 21. If the second operation or third operation is then performed while the second hand 21 is pointing to the time zone to start the reception process, the user can know by reading the hands 21, 71 that the reception process is executing and whether the reception process is executing in the navigation mode or the timekeeping mode because the hands 21, 71 indicate the reception mode.

Furthermore, because the time zone and reception mode are indicated by the long center hand, and the display range of the second hand 21 is large, the time zone and reception mode can be easily recognized and displayed.

To display the reception result after executing the confirm time zone operation and displaying the time zone on the display device 141, the user can simply execute the fourth operation while the time zone is displayed, does not need to use the input device 160 to first stop displaying the time zone data, and operation is simple.

When the time zone setting mode is set and the user wants to use the input device 160 to set the time zone for a region different from the current location, the positioning driver 320 does not execute the reception process even if the second operation is accidentally performed, and the time zone of the current location being set by the reception process can be prevented.

Because the confirm time zone operation can be performed by the user pressing the button B 52 when the crown 55 is at the 0 stop, the confirm time zone operation can be performed more easily than when the confirm time zone operation requires pulling the crown 55 out to the first stop or second stop.

As a result, the user can easily check what time zone is set by performing the confirm time zone operation and entering the time zone confirmation mode. The user also does not need to push the crown 55 in to the 0 stop to end the time zone confirmation mode, and forgetting to push the crown 55 in can be prevented.

The user can also immediately terminate the time zone confirmation mode and return to the normal display mode by performing the stop time zone confirmation operation.

Furthermore, because the time zone confirmation mode ends automatically when the hold-mode time passes without the input device 160 being operated, operation is easier than when the user must use the input device 160 to end the time zone confirmation mode.

Other Embodiments

The invention is not limited to the embodiments described above, and can be modified and improved in many ways without departing from the scope of the accompanying claims.

In this embodiment the positioning driver 320 and timekeeper 310 do not run the reception process in the time zone setting mode even if the second operation or third operation is performed, but the invention is not so limited. More specifically, the positioning driver 320 and timekeeper 310 may be configured to execute the reception process in this event. The display controller 340 also does not display the reception result when the fourth operation is performed in the time zone setting mode, but the display controller 340 may be configured to display the reception result.

In these cases, to run the reception process with the positioning driver 320 or the timekeeper 310 or to display the reception result when the time zone setting mode is set, the user can simply perform the second operation, third operation, or fourth operation when the time zone is being displayed without needing to use the input device 160 to cancel the time zone display, and operation is therefore simple.

In the embodiment described above, the mode setter 330 sets the time zone confirmation mode and time zone setting mode, but the invention is not so limited. More specifically, the mode setter 330 may be configured to set only the time zone setting mode. The reception process or the reception result display process may then be executed if the second operation, third operation, or fourth operation is performed while the time zone setting mode is set.

The reception process is executed in the foregoing embodiment when the time zone confirmation mode is set and the operation to manually start reception in the timekeeping mode (third operation) or the operation to manually start reception in the navigation mode (second operation) is performed, but the invention is not so limited. More specifically, a configuration in which the reception process is executed only when the operation that manually starts reception in the navigation mode is performed is also conceivable.

The reception result is displayed when the operation that displays the reception result (fourth operation) is performed while the time zone confirmation mode is set in this embodiment, but the invention is not so limited. More specifically, a configuration that does not display the reception result when the display reception result operation is performed in this case is also conceivable.

More specifically, if the control device 300 determines in S22 that button A 51 was pressed and determines in S13 that button A 51 was pressed for less than 3 seconds when the time zone confirmation mode is set in the process shown in FIG. 6, the control device 300 may return to step S21 without executing step S19 to display the reception result. The time zone confirmation mode can therefore be sustained if the operation to display the reception result is performed while the time zone confirmation mode is set.

The same operations (pressing button A 51 for 3 seconds or more and less than 6 seconds, and pressing button A 51 for 6 seconds or more) are performed to force reception in the timekeeping mode and navigation mode when in the normal time display mode and time zone confirmation mode, but the invention is not so limited. For example, a different button may be pressed, or the button may be pressed for a different length of time.

Because button B 52 must be pushed to set the time zone confirmation mode and button A 51 must also be pressed to run the reception process in the time zone confirmation mode, the chance of the reception process executing mistakenly in the time zone confirmation mode as a result of incorrect operation is small. How long the button must be pressed to manually start the reception process in the time zone confirmation mode can therefore be set shorter than in the normal time display mode. The time required to manually start reception in the time zone confirmation mode can therefore be shortened, and operation further simplified.

When the second operation or third operation is performed in the time zone confirmation mode in the foregoing embodiment, the hands 21, 71 indicate the reception mode, but the invention is not so limited. For example, the hands 21, 71 may be arranged to not indicate the reception mode.

Further alternatively, the second hand 21 may indicate the reception mode, and hand 71 not used to indicate the reception mode. Because a single hand 21 is used to indicate both the time zone and the reception mode in this event, the number of hands on the electronic timepiece 10 can be reduced compared with a configuration using different hands to indicate the time zone and reception mode. Further alternatively, a configuration in which the second hand 21 does not indicate the reception mode and the hand 71 indicates the reception mode is also conceivable.

Furthermore, when the second operation or third operation is performed in the time zone confirmation mode in the foregoing embodiment, the second hand 21 indicates the reception mode until the reception process ends, but the invention is not so limited. For example, the second hand 21 may indicate the reception mode for the first few seconds after the second operation or third operation is performed, and the second hand 21 may then indicate the number of GPS satellites 100 the reception device 121 has locked onto (the number of locked satellites) until the reception process ends. The number of locked satellites may be indicated by the second hand 21 pointing to the hour marker corresponding to the number of locked satellites. For example, if the number of locked satellites is 1, the second hand 21 points to 1:00, and if the number of locked satellites is 4, the second hand 21 points to 4:00.

In the foregoing embodiment, the second hand 21 indicates the timekeeping mode by pointing to the 0 second position, and indicates the navigation mode by pointing to the 30 second position, but the invention is not so limited. More specifically, the indicated positions are not limited to the 0 second position and 30 second position, and must simply be different positions. Further alternatively, symbols denoting the timekeeping mode and navigation mode may be disposed on the circumference of the dial, and the timekeeping mode and navigation mode indicated by the second hand 21 pointing to the appropriate symbol.

When the time zone confirmation mode is set and the reception process or reception result display ends in the foregoing embodiment, the control device 300 resumes the normal time display mode, but the invention is not so limited. More specifically, the control device 300 may return to the time zone confirmation mode.

The detection device 170 detects the second operation, third operation, and fourth operation by counting how long (number of seconds) the button A 51 is pressed, but the invention is not so limited. More specifically, the second operation, third operation, and fourth operation may be detected by the detection device 170 detecting that the button A 51 was pressed, and the control device 300 detecting how long (number of seconds) the button A 51 is pressed.

The electronic timepiece 10 in the embodiment described above has a display device 141 including a dial 11 and hands, but the invention is not so limited. An electronic timepiece may have a time display including an LCD panel, for example. In this case, a driver that drives the time display may include the driver circuit that drives the LCD panel.

The electronic timepiece in this configuration simply requires a time display function, and the time display does not need to be a display dedicated to displaying the time. Examples of such electronic timepieces include devices worn on the wrist or arm, for example, such as heart rate monitors that are worn on the user's wrist and measure the heart rate, and GPS loggers that are worn on the user's arm and measure and store current position information while the user is jogging, for example.

The electronic device of the invention is not limited to wristwatches (electronic timepieces), and can be used in a broad range of devices such as cell phones, mobile GPS receivers used when mountain climbing, and a wide range of other battery-powered devices that receive satellite signals transmitted from positioning information satellites.

The foregoing embodiments are described with reference to a GPS satellite 100 as an example of a positioning information satellite, but the positioning information satellite of the invention is not limited to GPS satellites and the invention can be used with Global Navigation Satellite Systems (GNSS) such as Galileo (EU), GLONASS (Russia), and Beidou (China). The invention can also be used with geostationary satellites in satellite-based augmentation systems (SBAS), and quasi-zenith satellites in radio navigation satellite systems (RNSS) that can only search in specific regions. The invention can also be used in configurations that receive and process satellite signals from multiple systems.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. An electronic device comprising:

a receiver that receives satellite signals;

a storage device that stores time zone data including set time zone data that is a time difference with respect to Coordinated Universal Time (UTC);

a display that displays a time based upon an internal time corresponding to the UTC and the set time zone data;

an interface including a crown and at least one button;

a detection device that detects an operation based upon actuation of the interface;

a display controller that controls the display to display the set time zone data when a first operation of the interface instructing displaying the time zone data is detected based upon the detection device detecting a first predetermined actuation operation at the interface;

a positioning driver, when the electronic device is in a time zone confirmation mode, that drives the receiver to run a reception process of the satellite signal in a positioning mode and acquire positioning information when a second operation is detected at the interface that instructs starting reception of the satellite signal in the positioning mode while the display is displaying the time zone data, wherein the second operation is detected based upon the detection device detecting a second predetermined actuation operation at the interface; and a time zone setter that sets the time zone data based on acquired positioning information, wherein the positioning driver is prevented from running the reception process when the second predetermined actuation operation is detected and the electronic device is in a time zone setting mode, wherein the display controller terminates the time zone confirmation mode and returns to a normal time display mode after determining that no actuation of the interface has occurred within a set hold-mode time.

2. The electronic device described in claim 1, wherein:

the positioning driver executes the reception process if the second operation is detected when time zone data is not displayed by the display.

3. The electronic device described in claim 1, further comprising: a timekeeper that operates the receiver to run the reception process in a timekeeping mode to acquire time information when a third predetermined actuation operation of the interface instructing starting reception in the timekeeping mode is detected when time zone data is displayed by the display, wherein the third predetermined actuation is detected when the electronic device is in the time zone confirmation mode.

4. The electronic device described in claim 3, wherein:

the display including a plurality of hands; and the display controller sets at least one hand of the plurality of hands to indicate the set time zone data when the first predetermined actuation operation is detected, and while the hand indicates the time zone data, sets at least another hand of the plurality of hands to indicate the positioning mode if the second determined actuation operation is detected, and sets the at least another hand of the plurality of hands to indicate the timekeeping mode if the third predetermined actuation operation is detected.

5. The electronic device described in claim 1, further comprising: a timekeeper that operates the receiver to run the reception process in a timekeeping mode to acquire time information when a third predetermined actuation operation of the interface instructing starting reception in the timekeeping mode is detected when time zone data is not displayed by the display, wherein the third predetermined actuation is detected when the electronic device is in the normal time display mode.

6. The electronic device described in claim 1, wherein:

the display controller displays the reception result on the display if a fourth predetermined operation of the interface instructing displaying the reception result is detected while time zone data is displayed on the display.

7. The electronic device described in claim 1, further comprising:

a mode setter that selects and sets either a time zone confirmation mode or time zone setting mode based on operation of the interface;

the display controller displaying the set time zone data on the display if a confirm time zone operation, which is the first predetermined actuation operation of the interface, is performed and the time zone confirmation mode is set by the mode setter;

the display controller displaying the set time zone data on the display, and the time zone setter setting the time zone data according to the change time zone operation of the interface, if a set time zone operation of the interface is performed and the time zone setting mode is set by the mode setter; and the positioning driver executing the reception process if the second operation is detected when the time zone confirmation mode is set, and executing the reception process if the second predetermined actuation operation is detected when time zone setting mode is set.

8. The electronic device described in claim 1, further comprising:

a time zone display that displays at least one of the time difference or city names corresponding to the time differences;

wherein the display includes a hand and a display controller that controls the display to display the set time zone data by indicating that at least one of the time differences or one of the city names in the time zone display by the hand.

9. The electronic device described in claim 1, wherein the positioning driver, when the electronic device is in the time zone confirmation mode, drives the receiver to run the reception process of the satellite signal in the positioning mode while in the time zone confirmation mode and acquire positioning information when the second operation is detected at the interface that instructs starting reception of the satellite signal in the positioning mode while the display is displaying the time zone data.

10. An electronic device comprising:

a storage device that stores time zone data including set time zone data that is a time difference with respect to UTC;

a mode setter that selects and sets either a time zone confirmation mode or time zone setting mode based on operation of an interface, the interface including a crown and at least one button;

a display controller displaying the set time zone data on the display if a confirm time zone operation corresponding to a first predetermined actuation operation at the interface is performed and the time zone confirmation mode is set by the mode setter;

the display controller displaying the set time zone data on the display, the time zone setter sets the time zone data according to a change time zone operation of the interface if a set time zone operation of the interface is performed and the time zone setting mode is set by the mode setter; and a positioning driver executing a reception process when a second predetermined actuation operation at the interface is detected when the time zone confirmation mode is set, and preventing execution of the reception process when the second predetermined actuation operation is detected when time zone setting mode is set, wherein the display controller terminates the time zone confirmation mode and returns to a normal display mode after determining that no actuation of the interface has occurred within a set hold-mode time.

11. The electronic device described in claim 10, wherein:

the mode setter detects the confirm time zone operation when the at least one button is pushed while the crown is at a 0 stop.

12. The electronic device described in claim 10, wherein:

the mode setter ends the time zone confirmation mode if a stop time zone confirmation operation of the interface instructing ending the time zone confirmation mode is detected.

13. The electronic device described in claim 10, wherein:

the mode setter ends the time zone confirmation mode if a previously set hold-mode time passes without the interface being operated after the time zone confirmation mode is set.

14. The electronic device described in claim 10, further comprising:

a time zone display that displays at least one of the time difference or city names corresponding to the time differences;

wherein the display includes a hand and a display controller that controls the display to display the set time zone data by indicating that at least one of the time differences or one of the city names in the time zone display by the hand.

15. A control method of an electronic device, the control method comprising:

displaying time zone data on a display of the electronic device when a first predetermined actuation operation of an interface of the electronic device instructing displaying time zone data is detected, the interface including at least one button and a crown;

detecting a second predetermined actuation operation of the interface to instruct starting reception in a positioning mode based upon the actuation;

determining whether at least one of a time zone confirmation mode or a time zone setting mode is set;

upon detecting the second predetermined actuation operation and determining the time zone confirmation mode is set, driving a receiver of the electronic device to run a reception process to receive satellite signals in the positioning mode and acquire positioning information while the display is displaying the time zone data;

preventing driving of the receiver to run the reception process when the second predetermined actuation operation is detected and determining the time zone confirmation mode is set; and setting time zone data based on acquired positioning information, the set time zone data being a time difference with respect to UTC.

16. The control method described in claim 15, further comprising:

determining, while the electronic device is in the time zone confirmation mode, whether actuation of the interface has occurred; and terminating the time zone confirmation mode and returning to a normal display mode upon determining that no actuation of the interface has occurred within a set hold-mode time.

* * * * *